No. 607,402. Patented July 12, 1898.
E. W. YOUNG.
PNEUMATIC TIRE.
(Application filed June 25, 1896. Renewed Feb. 4, 1897.)
(No Model.) 2 Sheets—Sheet 1.
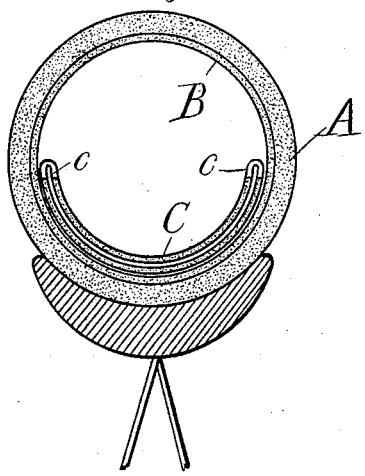
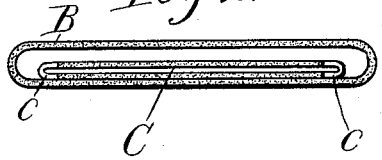
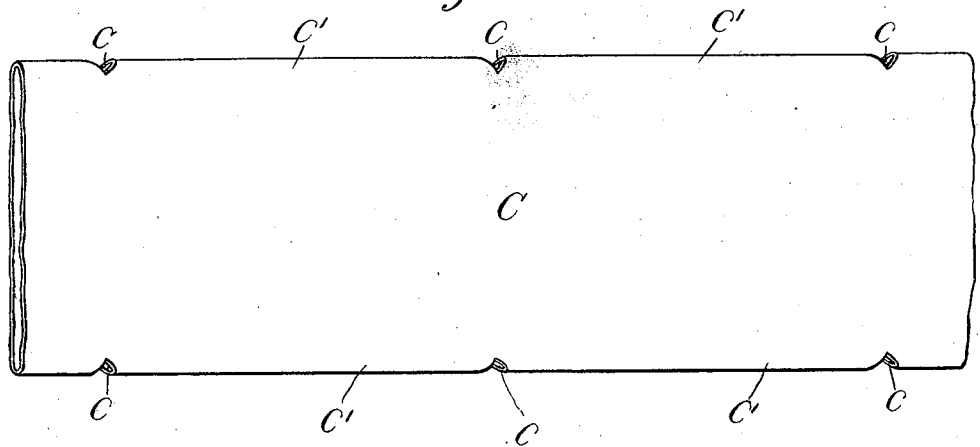
Witnesses:
A. F. Durand.
Reta M. Wagner
Inventor:
Ernest W. Young.
by Page and Belfield.
attys.
THE NORRIS PETERS CO., PHOTO-LITHO., WASHINGTON, D. C.

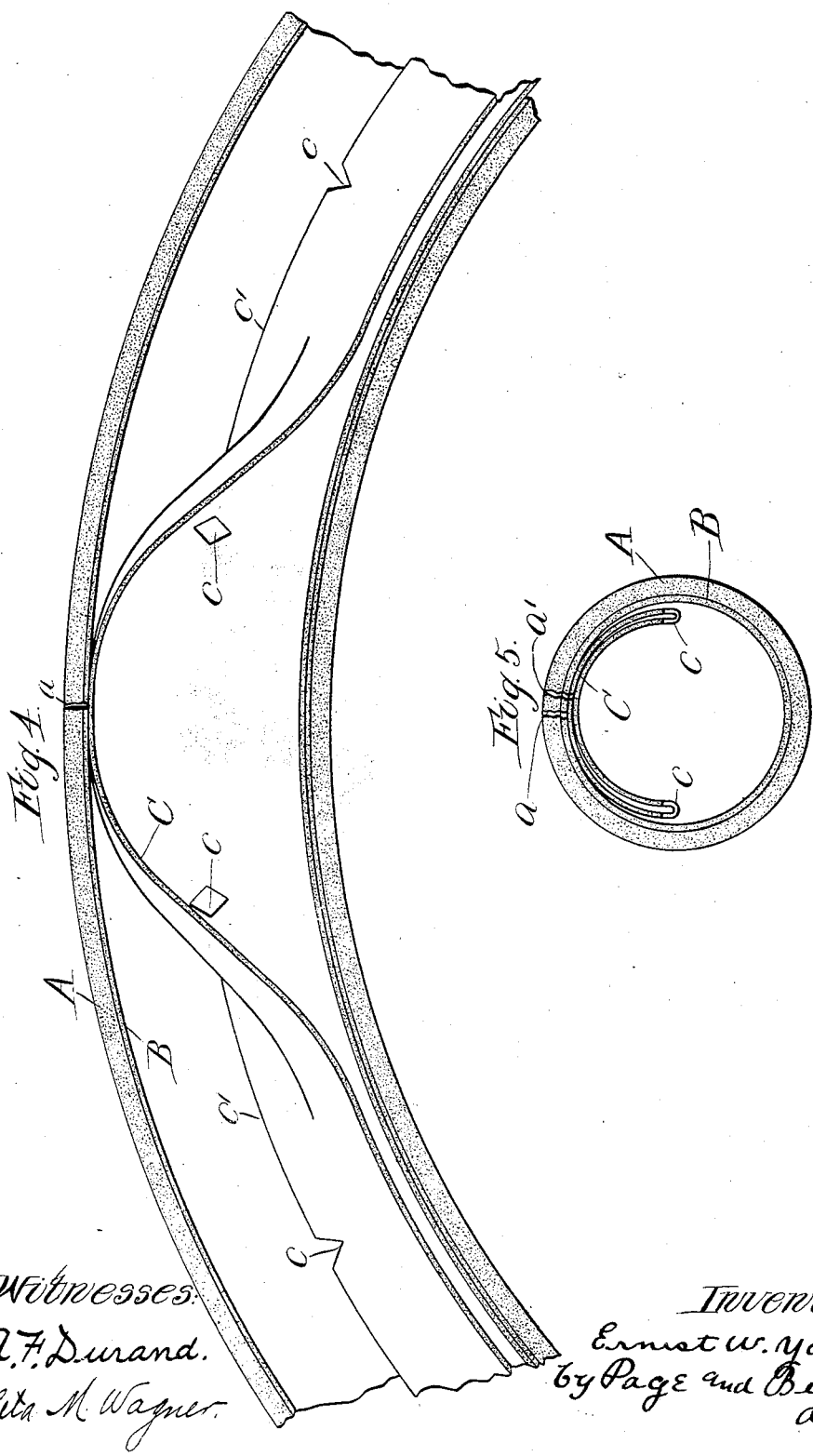

UNITED STATES PATENT OFFICE.

ERNEST W. YOUNG, OF AUSTIN, ILLINOIS, ASSIGNOR, BY MESNE ASSIGNMENTS, TO THE MORGAN & WRIGHT, OF CHICAGO, ILLINOIS.

PNEUMATIC TIRE.

SPECIFICATION forming part of Letters Patent No. 607,402, dated July 12, 1898.

Application filed June 25, 1896. Renewed February 4, 1897. Serial No. 622,024. (No model.)

*To all whom it may concern:*

Be it known that I, ERNEST W. YOUNG, a citizen of the United States, residing at Austin, in the county of Cook and State of Illinois, have invented a certain new and useful Improvement in Pneumatic Tires, of which the following is a specification.

In a pneumatic tire embodying my invention the air-chamber contains a normally-flattened repair-tube, which is in open communication with the air-chamber and arranged to normally lie adjacent to the base of the tire, so as to be out of the way of puncture and at the same time afford two flattened tube sides, which can be successively picked up and cemented to the wall of the air-chamber at the tread side of the tire for the purpose of closing punctures. The provision of this normally-flattened repair-tube involves economy in manufacture, owing to the readiness with which it can be drawn in the tire. It also provides between the two sides of the repair-tube a form of flexible connection which admits of said sides being picked up without perceptible resistance, and which also does away with tension tending to draw away such flattened side portions of the repair-tube when cemented to the inner wall of the tire at the tread side thereof, it being observed that when cement is introduced through a puncture in the tread and the latter pressed down, so as to engage and pick up one of the sides of the tube, it is most desirable to avoid both resistance to the picking up of such side of the tube and tension thereon after it is picked up, since otherwise the portion of the tube newly cemented to the inner wall of the tire at the tread side of the latter would be liable to separation from such inner wall before setting of the cement. By thus forming the elastic patching fabric as a normally-flattened tube, which is normally held against the base of the tire-tube, the two free patching-layers which can be successively employed are practically free along their edge or marginal portions, being simply connected together by the elastic material of which the tube is formed, and hence while the lower layer will lie directly against the base of the tire-tube the upper layer will lie against the lower layer and be maintained against accidental side shift by reason of its said connection with the lower layer.

In the accompanying drawings, Figure 1 is a transverse section through a double-tube pneumatic tire seated upon a wheel-rim and embodying my invention. Fig. 2 is a like view of the air-tube containing the repair-tube. Fig. 3 is a plan view of a portion of the repair-tube. Fig. 4 is a section taken longitudinally through a portion of the tire with what may be termed the "upper" flattened side of the repair-tube—that is to say, the side nearest the tire-tread—picked up and cemented to a punctured portion of the tire. Fig. 5 is a section taken transversely through the tire with both flattened sides of the repair-tube picked up and held by cement for the purpose of closing double punctures.

The sheath or casing A of the tire can be of any desired or suitable type, and it may contain an air-tube B, the air-chamber in such construction of tire being formed within the air-tube. The normally-flattened repair-tube C is flexible and preferably of thin rubber. When thus made of rubber, it can be vulcanized in a flattened condition. When arranged within the air-chamber of the tire, the said repair-tube lies adjacent to the base of the tire and extends longitudinally within the tire-tube and against the base or rim side of the latter, as illustrated in Fig. 4, and it will normally continue in such position, regardless of the inflation of the tire, as illustrated in Fig. 1. The repair-tube is provided with ports formed by slits, notches, or like apertures, so as to provide air-passage between its interior and the air-chamber, a simple and desirable way being to provide it with ports *c* along its longitudinal edge portions, so as to leave the flattened sides of the repair-tube intact.

When a puncture occurs through the tread of the tire, as at *a*, Fig. 4, cement can be introduced through the puncture, and by then depressing such portion of the tire to a suitable extent it will engage the upper side of the repair-tube and the two will adhere together by reason of the previously-introduced cement. Upon again distending the tire a portion of the upper side of the repair-tube will be picked up, as in Fig. 4, and by reason of the portage established between the interior of the repair-tube and the air-chamber the inflation of the tire will not force the picked-up portion of the repair-tube away from the punctured portion of the tire, since an equilibrium of air-pressure will be established between the space at opposite sides of all of such picked-up portion of the repair-tube save that which is cemented to the punctured portion of the tire.

Where punctures occurring in the tire are not close together, various portions of the upper side of the repair-tube can be picked up as a means for patching the damaged parts of the tire; but should a second puncture occur in close proximity to one previously made and thereby extend through a picked-up portion of the upper side of the repair-tube, as at $a'$ in Fig. 5, the lower side of the repair-tube can be cemented to and picked up by the punctured portion of the upper side of such repair-tube, as in said figure.

By thus providing a normally-flattened repair-tube the two layers of patching material provided by such repair-tube are united by the bent longitudinal edge portions $c'$ of said tube. These bends $c'$ in the elastic rubber repair-tube are obviously so formed and arranged as to avoid any resistance to the picking up of the upper side of the repair-tube, since the picking up of such side of the tube will simply open the bends or folds $c'$ in a natural way. Also by providing such repair-tube and arranging it with free longitudinal edge portions there will be no opposition to the picking up of the lower side of the repair-tube, as in Fig. 5. This repair-tube can also be employed in the "hose-pipe" or one-tube construction of tire, as will be obvious without further illustration, it being understood that in such tire the inner air-tube is replaced by a tubular rubber layer secured to the next adjacent tubular layer of the tire.

From the foregoing it will be seen that the hollow or pneumatic tire-tube, whether of the single or double tube type, contains a longitudinally-extending elastic patching web or fabric which is normally held against and in contact with the base or rim side of the tire-tube throughout its length and which is normally unattached to such tire-tube and has free longitudinal edges or edge portions. This arrangement also permits the closing of punctures at either side of the longitudinal middle portions of the tread side of the tire-tube, it being obvious that where a puncture is thus located the punctured part of the tire-tube can be pressed in obliquely, so as to permit a portion of the web at one side of its longitudinal middle portion to be employed as a patch.

What I claim as my invention is—

1. A hollow or pneumatic tire-tube containing an elastic patching-web which is normally held against and in contact with the rim side of the tire-tube throughout its length while unattached thereto and having free longitudinal edges, substantially as described.

2. A hollow or pneumatic tire-tube containing a longitudinally-extending, elastic patching-web normally detached from the tire-tube and in contact throughout its length with the rim side of the tire-tube, substantially as described.

3. A hollow or pneumatic tire-tube containing a longitudinally-extending elastic patching-layer normally held along its length close to the rim side of the tire-tube and being unattached thereto with its middle and edge portions free to be drawn up for patching punctures along the middle and at opposite sides of the middle portion of the tread side of the tire, substantially as described.

4. A hollow or pneumatic tire-tube containing a couple of longitudinally-extending patching-layers of elastic fabric, the one being normally upon the other with the upper layer flexibly connected with the lower layer and both layers being normally unattached to the tire-tube and having free edges, substantially as described.

5. A pneumatic tire containing within its air-chamber a normally-flattened repair-tube adapted to communicate with the air-chamber and arranged to lie in a flattened condition normally at the base of the tire regardless of the inflation of the air-chamber, the said repair-tube having free bent edge portions and having its upper and lower flattened sides, free to be picked up and held by cementation for the purpose of closing punctures, substantially as described.

6. A pneumatic tire comprising a sheath or casing, an inner air-tube, and a normally-flattened repair-tube adapted to communicate with the interior of the air-chamber and arranged to lie in a flattened condition adjacent to the base of the tire regardless of the inflation of the air-tube, said repair-tube being free along its longitudinal edges and having its upper and lower sides free to be picked up and held by cementation for the purpose of closing punctures, substantially as described.

7. A pneumatic tire containing within its air-chamber a normally-flattened repair-tube arranged to lie in a flattened condition adjacent to the base of the tire regardless of the inflation of the air-chamber, and having its longitudinal marginal portions free and provided with ports, substantially as described.

8. A pneumatic tire containing within its air-chamber a normally-flattened repair-tube arranged to lie in a flattened condition adjacent to the base of the tire regardless of the inflation of the air-chamber, and having its longitudinal marginal portions free and provided with notches $c'$, substantially as described.

ERNEST W. YOUNG.

Witnesses:
RETA M. WAGNER,
ARTHUR F. DURAND.